United States Patent
Amaya et al.

(10) Patent No.: US 11,097,497 B2
(45) Date of Patent: Aug. 24, 2021

(54) SUPPORT AND METHOD OF SHAPING WORKPIECE AND SUPPORT

(71) Applicant: Matsuura Machinery Corporation, Fukui (JP)

(72) Inventors: Kouichi Amaya, Fukui (JP); Kousuke Ishimoto, Fukui (JP)

(73) Assignee: Matsuura Machinery Corporation, Fukui (JP)

( * ) Notice: Subject to any disclaimer, the term of this patent is extended or adjusted under 35 U.S.C. 154(b) by 0 days.

(21) Appl. No.: 16/786,271

(22) Filed: Feb. 10, 2020

(65) Prior Publication Data

US 2020/0180237 A1   Jun. 11, 2020

Related U.S. Application Data

(62) Division of application No. 15/815,877, filed on Nov. 17, 2017, now Pat. No. 10,899,088.

(51) Int. Cl.
| | |
|---|---|
| *B29C 64/40* | (2017.01) |
| *B29C 67/00* | (2017.01) |
| *B29C 64/165* | (2017.01) |
| *B29C 64/135* | (2017.01) |
| *B33Y 80/00* | (2015.01) |
| *B29K 105/24* | (2006.01) |
| *B29C 64/153* | (2017.01) |
| *B33Y 10/00* | (2015.01) |

(Continued)

(52) U.S. Cl.
CPC ........ *B29C 67/0011* (2013.01); *B29C 64/135* (2017.08); *B29C 64/165* (2017.08); *B29C 64/40* (2017.08); *B33Y 80/00* (2014.12); *B29C 64/153* (2017.08); *B29C 64/386* (2017.08); *B29K 2105/24* (2013.01); *B33Y 10/00* (2014.12); *B33Y 50/00* (2014.12)

(58) Field of Classification Search
CPC ... B29C 64/40; B29C 64/245; B29C 67/0011; B29C 64/135; B29C 64/165; B29C 64/153; B29C 64/386; B33Y 10/00; B33Y 30/00; B33Y 70/00; B33Y 80/00; B33Y 50/00; B32B 37/00; B32B 41/00; C08F 226/10; B29K 2105/24
USPC .......................... 264/497, 113, 405; 425/447
See application file for complete search history.

(56) References Cited

U.S. PATENT DOCUMENTS

| | | |
|---|---|---|
| 5,595,703 A | 1/1997 | Swaelens |
| 7,084,370 B2 | 8/2006 | Hagemeister |
| (Continued) | | |

FOREIGN PATENT DOCUMENTS

| | | |
|---|---|---|
| JP | 03-136834 A | 6/1991 |
| JP | 9-511705 A | 11/1997 |
| (Continued) | | |

*Primary Examiner* — Matthew J Daniels
*Assistant Examiner* — Gregory Chad Grosso
(74) *Attorney, Agent, or Firm* — Richard M. Goldberg

(57) ABSTRACT

A support for supporting a workpiece from below efficiently while reducing the amount of necessary materials, and a shaping method for shaping the workpiece and support efficiently includes a hollow state support for supporting a workpiece from below, and the hollow state support has a lattice form with crossing of straight linear or curved columnar bodies, wherein a sintered strength at a connecting region with the workpiece is lower than the sintered strength at the other regions.

10 Claims, 2 Drawing Sheets

(51) Int. Cl.
*B29C 64/386* (2017.01)
*B33Y 50/00* (2015.01)

(56) References Cited

U.S. PATENT DOCUMENTS

2015/0197862 A1* 7/2015 Engel ........................ B22F 3/24
                                                              75/246
2016/0368224 A1* 12/2016 Ooba ...................... B33Y 80/00
2017/0037674 A1*  2/2017 Hooper ................... E06B 3/273
2018/0304541 A1* 10/2018 Barth ...................... B29C 64/40
2019/0337284 A1* 11/2019 Eggers ................... G05B 15/02

FOREIGN PATENT DOCUMENTS

| JP | 2012-111226 A | 6/2012 |
| JP | 2015-227057 A | 12/2015 |

* cited by examiner

[Fig. 1] (a)
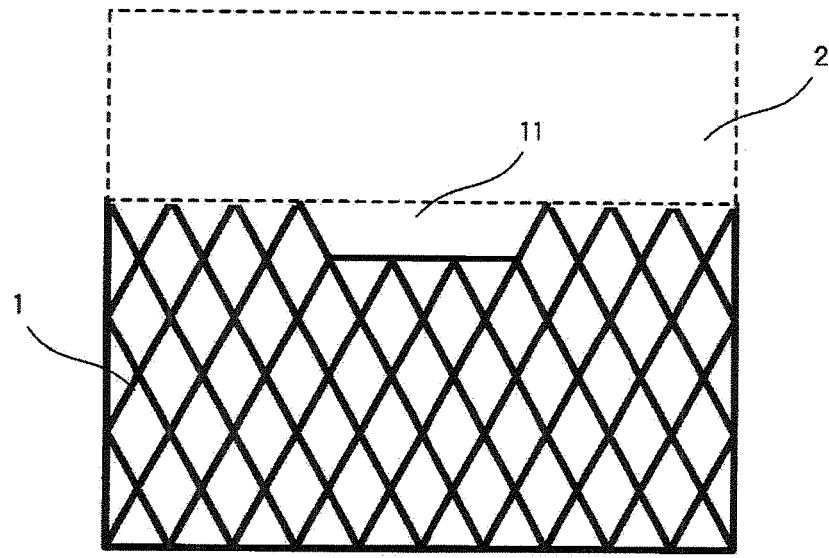
[Fig. 1] (b)
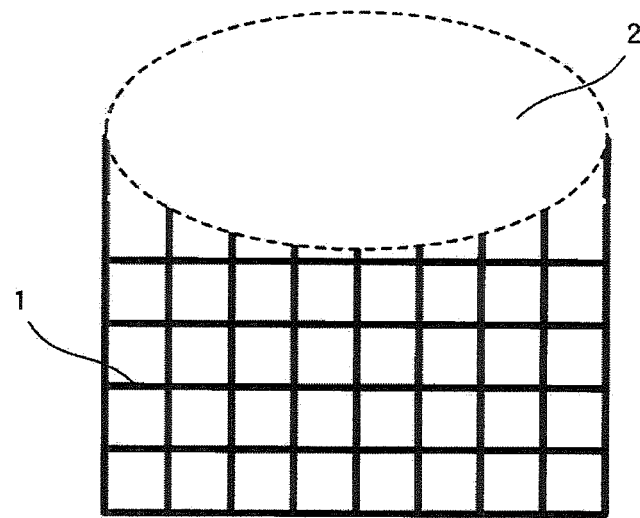
[Fig. 1] c)
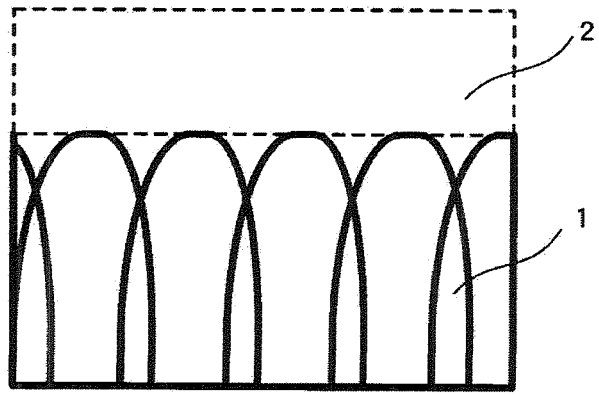

[Fig. 2]
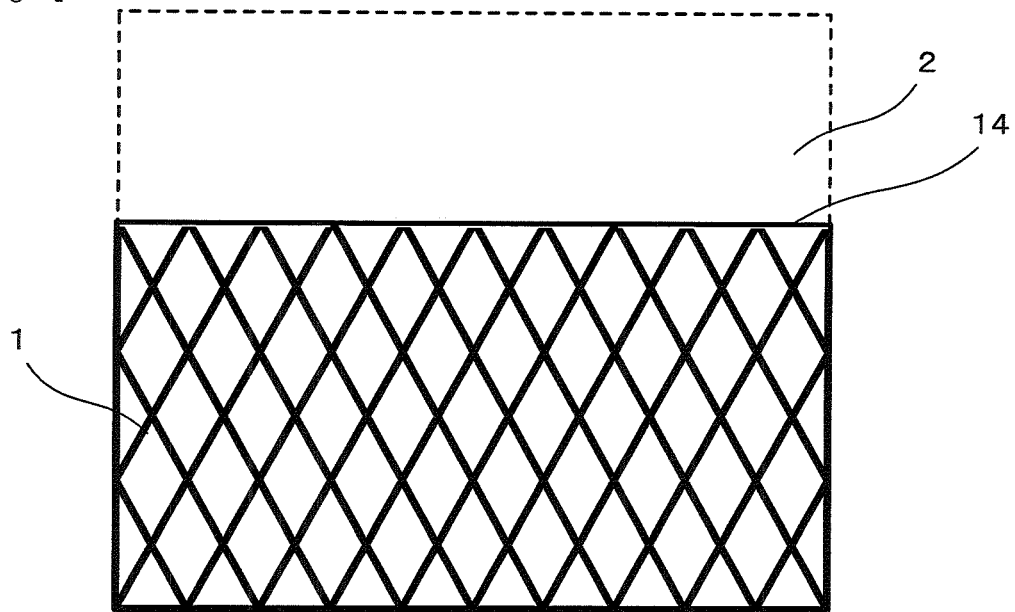
[Fig. 3]
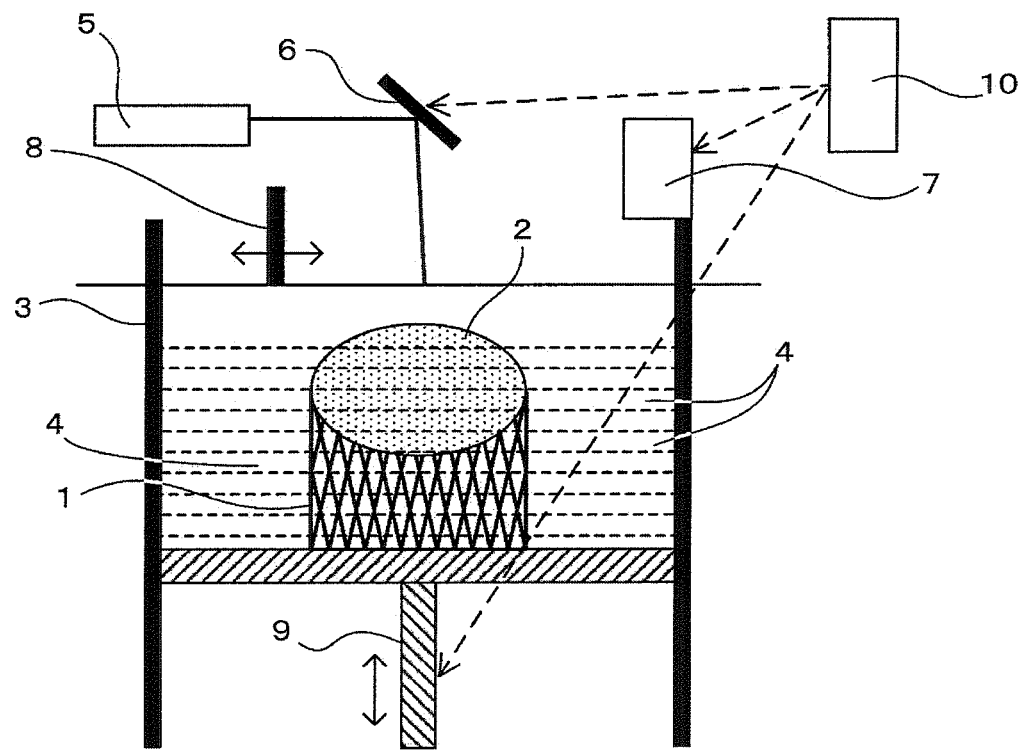

SUPPORT AND METHOD OF SHAPING WORKPIECE AND SUPPORT

BACKGROUND OF THE INVENTION

Technical Field

The present invention relates to a support that supports a workpiece which is to be produced by a three-dimensional shaping system, and to a method of shaping the workpiece and the support.

Background Art

A support for supporting a workpiece that is to be worked from below with a tool or the like differs in its shape and size according to the shape and size of the workpiece, and once working of the workpiece has been completed, it is removed from the workpiece and disposed away.

In the prior art, however, columnar or tubular shapes are employed as supports for the most part, as a construction exhibiting excess strength beyond what is necessary for support from below the workpiece.

Consequently, multiple tools and special machines must necessarily be used for disposal, which requires a great amount of additional labor.

Moreover, excessively strong supports incur needless material costs, which is disadvantageous in terms of production cost.

Patent Document 1 describes a method for producing a three-dimensional object, wherein a support structure 21 on the lower end is divided into a core region 22 and an external capsule 23 serving as a connecting region, with softer irradiation during solidification of the external capsule 23 by laser light ([FIG. 2], p. 8, lines 20-21, p. 9, line 3).

However, the core region 22 shown in FIG. 2 of the aforementioned publication has a material-filled structure, and this has necessitated excessive material cost.

In regard to the aforementioned core region 22, Patent Document 1 states: "It is solidified in separate distant partial regions. Each region is either completely unconnected, or connected via a connecting web." (p. 8, lines 5 to 4 from bottom), thereby disclosing the structure other than the filled structure, but this description is unclear and does not concretely specify the structure of the core region 22.

Patent Document 2 discloses the construction of a lattice-like support structure with thin sheets mutually crossing at a specified angle (FIG. 9, claim 2, p. 3, lower left column, line 3 from bottom to lower right column, line 1 from top).

However, Patent Document 2 does not disclose or suggest in any way the relationship between the strength at the connecting region between the support structure and the object to be supported above, and the strength at the other regions.

PRIOR ART DOCUMENTS

Patent Documents

Patent Document 1: Japanese Announced Unexamined Patent Application No. H09-511705A
Patent Document 2: Japanese Published Unexamined Patent Application No. H03-136834A

SUMMARY OF INVENTION

Problem to be Solved

An object of the present invention is providing a support for supporting a workpiece from below efficiently with reducing the amount of necessary materials, and providing a shaping method for shaping the workpiece and support efficiently.

Solution for Problem

In order to solve the aforementioned problems, the present invention has the following basic features.

(1) A hollow state support for supporting a workpiece from below has a lattice form with crossing of straight linear or curved columnar bodies, wherein a sintered strength at a connecting region with the workpiece is lower than the sintered strength at the other regions.

(2) A method of shaping a support, employing a three-dimensional shaping system that carries out lamination consisting of repeating alternation of a powder layer-forming step and a sintering step in which the powder layer is sintered by irradiation with a moving laser beam or electron beam, wherein the object of shaping at the upper region is a workpiece and the object of shaping at the lower region is a support according to (1) above.

Advantageous Effects of Invention

In the basic construction (1), the support is hollow, whereby the load of the workpiece is distributed in an essentially uniform state so that both bearing of the load and economy of materials is achieved.

It may be apparently grounded by the fact that the columnar bodies forming the lattice form according to basic construction (1) does not have a thin sheet in-between as in Patent Document 2.

Furthermore, since the sintered strength in the region in contact with the workpiece is lower than in the other regions, it is possible to easily cut off the support of the columnar bodies from the workpiece.

According to basic construction (2), it is possible to efficiently accomplish the operation of employing a three-dimensional shaping system and shaping the workpiece and the support of basic construction (1) at the same time.

BRIEF DESCRIPTION OF THE DRAWINGS

FIG. 1 is a lateral cross-sectional view showing an embodiment that employs a lattice form created by crossing of columnar bodies, as the hollow form of the support of basic construction (1), wherein FIG. 1(a) shows a case of a lattice form in which each lattice section is obliquely crossing with the vertical direction, FIG. 1(b) shows a case of a lattice form in which portions coincide with the vertical direction and the remaining portions are perpendicular to that direction, and FIG. 1(c) shows a case of a lattice form in which each lattice section is in the vertical direction at the bottom end and, due to successive curving, is in the horizontal direction at the top end.

FIG. 2 is a cross-sectional view in the vertical direction, for an embodiment of a support with a lattice form according to basic construction (1), wherein the surface that is to support the workpiece is formed at the top end.

FIG. 3 is a lateral cross-sectional view, for an embodiment of the shaping method of basic construction (2) wherein a support with a lattice form is shaped.

Note that the dotted lines indicate the state of control data transmission from a controller to different operating parts.

DESCRIPTION OF EMBODIMENTS OF THE INVENTION

To compare again the construction of basic construction (1) and a lattice form produced by crossing the thin sheet-like supports described in Patent Document 2 (hereunder referred to as "thin sheet-like lattice form"), if it is considered that the linear crossing portions of the thin sheet-like lattice form exhibit the necessary indispensable function for supporting a weight while preventing their own deformation, the columnar lattice form employed by basic construction (1) is evaluated as a structure in which the region of the thin sheet itself is abstracted from the thin sheet-like lattice form, selecting linear crossing sections that support a weight while preventing deformation.

By thus abstracting the region of the thin sheet itself while selecting linear crossing sections from the lattice form, it is possible to achieve both support of the load of the workpiece 2 and reduction in materials.

In the case of a columnar lattice form, it is common to employ an embodiment with a uniform thickness, as shown in FIGS. 1(a), (b) and (c).

In this embodiment, the cross-sectional area of each region does not change, it is possible to avoid the excessive use of material for formation of extra regions with insignificant and unnecessary thicknesses, resulting from the use of prescribed thicknesses for small sections that is necessary to prevent breakage caused by concentration of strain at sections with small cross-sectional areas when the thickness is not uniform.

In basic construction (1), for an embodiment in which the cross-sectional area in the horizontal direction gradually increases toward the lower side, it is possible to prevent overturning of the support 1 even when the location supporting the workpiece 2 is high, and this likewise applies to the lattice forms of FIGS. 1(a), (b) and (c).

FIG. 1(a) shows the state of an embodiment wherein each lattice section is set in a slanted direction with respect to the vertical direction along the direction in which the workpiece 2 is supported.

As shown in FIG. 1(a), vertical lattice sections are set crossing with each lattice section at the horizontal ends, and horizontal lattice sections are set crossing with each lattice section at the lower end, thereby allowing stable support of the workpiece 2 to be achieved, and this likewise applies for the embodiment shown in FIG. 1(c).

In the case of a lattice form obliquely crossing with the vertical direction, a bending moment M is generated in each cross-section of the lattice form due to the load of the workpiece 2, and if the curvature radius with bending by bending moment M is represented as ρ, then the following basic general formula is valid:

$$\rho = (EI)/M \qquad \text{[Formula 1]}$$

(where E is the modulus of longitudinal elasticity, or Young's modulus, and I is the secondary moment of the cross-section).

As clearly seen from this general formula, in order to reduce deformation with a larger value for the curvature radius ρ, a material may be selected having a cross-sectional shape (specifically, a cross-sectional circular shape) with a large Young's modulus E and a large secondary moment I.

Such a material is selected based on whether, in concrete experimentation using lattice-shaped supports 1 conforming to different workpieces 2, the support 1 does not only not break but also essentially does not deform.

FIG. 1(b) shows the state of an embodiment in which sections of each lattice match the vertical direction along the direction in which the workpiece 2 is supported, and the remaining sections are perpendicular to the vertical direction.

For this embodiment, if the load of the workpiece 2 acting on the cross-section of each lattice form is represented as F and the length of displacement in the vertical direction at the top end of the cross-section of the lattice form is represented as x, then the following basic general formula is valid:

$$F/S = E(x/L) \qquad \text{[Formula 2]}$$

(where S is the cross-sectional area, E is the Young's modulus and L is the length of the support in the vertical direction).

As clearly seen from this general formula, in order to reduce x which represents the degree of deformation, a material may be selected having a high Young's modulus for a given cross-sectional area S.

FIG. 1(c) shows an embodiment set so that each lattice section is vertically oriented at the bottom end, and successively curves to change orientation horizontally at the top end.

In this embodiment, at the lower end and its vicinity, displacement occurs according to the general formula of [Formula 2] above, while the other regions resolve to a bending moment M according to the general formula of [Formula 1] above.

In the case of this embodiment, the support 1 may support the workpiece 2 in a pressure-resistant state at the lower end and its vicinity, while at the upper end, it may support the workpiece 2 in a stable manner by the horizontal lattice sections.

Such a material is selected based on whether, in concrete experimentation using lattice-shaped supports 1 conforming to different workpieces 2, the support 1 does not only not break but also essentially does not deform.

From the viewpoint of convenience of removing the support 1 in basic construction (1), as shown in FIG. 1(a), an embodiment may be employed wherein a notch 11 for inserting the operator's fingers when cutting the support 1 off from the workpiece 2, is provided horizontally at or near the top end of the lattice form.

In the case of this embodiment, the operator inserts his/her own hand into the notch 11 to allow smooth removal of the support 1 from the workpiece 2.

When the lattice form extends up to the top end of the support 1 in basic construction (1), support of the workpiece 2 may be unstable.

Considering such conditions, basic construction (1) may employ an embodiment in which a flat surface or curved surface 14 for supporting the workpiece 2 is formed at the top end of the lattice form, as shown in FIG. 2 (a flat surface is shown in FIG. 2).

When the workpiece 2 has been situated on the flat surface or curved surface 14, the support 1 supports the workpiece 2 in a stable manner.

In the shaping method according to basic construction (2), as shown in FIG. 3, a three-dimensional shaping system is employed and the workpiece 2 is shaped in the upper region, while the support 1 of basic construction (1) is shaped in the lower region.

In this three-dimensional shaping system, similar to a common three-dimensional shaping system, a laser beam or electron beam supply 5, a scanner 6, a powder supply tool 7, a squeegee 8, a table 9 and a controller 10 are employed as essential constituent elements.

Normally, the shape of the support 1 at each height position is designed for shaping by a CAM system or CAE system to adapt the shape and load of the workpiece 2.

When the shape is specifically designed using a CAM system or CAE system, the most suitable shape to adapt the shape and load of a given workpiece 2 is selected based on previously accumulated data.

However, when the shape at different heights is to be designed adapting a new shape and load of a workpiece 2, the nearest data and the shape of the support 1 at different heights corresponding to those data are selected from the previously accumulated data of workpiece 2 shape and load, and a program is employed that corrects the dimensions of the shape at different height positions selected as described above, based on proportional distribution using the proportion between the two sets of data, to allow further automatic design.

An embodiment may of course be employed in which the notch 11 shown in FIG. 1(a) is also designed by a CAM system or CAE system.

With basic construction (2) using a CAM and CAE system, therefore, it is possible to very efficiently shape the support 1.

Similar to the requirement for selection of the material composing the workpiece 2 to adapt the function of the workpiece 2, a suitable material is also preferably selected for the support 1 as well, for support of the workpiece 2.

In basic construction (2), an appropriate material may be selected to adapt the thickness of the support 1 and the direction at each height position.

The support 1 and workpiece 2 will naturally differ in the properties of the necessary materials.

That is, since the strength required per unit volume is lower for the support 1 than for the workpiece 2, an embodiment may be employed in which the degree of sintering of the support 1 is lower than the degree of sintering of the workpiece 2.

A specific method for obtaining different degrees of sintering for this purpose may be selected from among:

(1) a method of setting the thickness of the support 1 to be larger than the thickness of the workpiece 2 at each laminating unit 4, (2) a method of using the same thickness for the laminating units 4, and setting the radiation dose of the laser beam or electron beam per unit area for the support 1 to be lower than for the workpiece 2, and (3) a method of setting the thicknesses of the laminating units 4 and the radiation dose per unit area to be the same, while conducting irradiation every several laminating units for the support 1 and conducting irradiation every single laminating unit for the workpiece 2.

Based on this selection, it is possible to select a condition for basic construction (2) which does not require as powerful a degree of sintering for the workpiece 2 as for the support 1, thereby allowing efficient production to be carried out.

A description will be given below according to Examples.

Example 1

As a feature of Example 1, the degree of sintering of one or several powder layers formed between the top end of the support 1 and the bottom end of the workpiece 2 is lower than the degree of sintering at the other lower side shaping regions of the support 1.

In Example 1 having this feature, at the stage of completion of the single step in which the support 1 and the workpiece 2 have both been shaped, a region is formed between them wherein the degree of sintering is lower than the degree of sintering of the support 1, and it is possible to easily separate the two.

The small degree of sintering referred to here, which is sufficient for the need, is a degree of sintering that may barely maintain bonding between the workpiece 2 and the support 1 without separation between them even when vibration is produced during working of the workpiece 2.

The criteria for setting such a sintered state may only be confirmed by accumulated experimentation based on trial and error for combinations of different workpieces 2 and the support 1.

Example 2

As a feature of Example 2, in order to finally achieve the feature described above, sintering is omitted in some of the powder layers among the plurality of powder layers formed between the top end of the support 1 and the bottom end of the workpiece 2.

Even if sintering is omitted for some of the powder layers, the sintering of the other regions may maintain bonding between the unsintered powder layers, although the degree of bonding is very minimal compared to that by the actual sintering.

As a result, Example 2 also allows easy separation between the support 1 and the workpiece 2.

The region range for the degree to which sintering of some of the powder layers may be omitted while still allowing maintenance of the bonded state between the support 1 and the workpiece 2 and easy separation, must also be confirmed by accumulated experimentation based on trial and error.

INDUSTRIAL APPLICABILITY

Thus, the present invention achieves both the necessary strength and low economic cost for a support that supports a workpiece, while also creating efficient production conditions for both workpieces and supports, and it is therefore of tremendous value in the field of machine tools.

REFERENCE SIGNS LIST

1: Support
11: Notch
14: Flat surface or curved surface
2: Workpiece
3: Container
4: Laminating unit by powder layer
5: Laser beam or electron beam supply
6: Scanner
7: Powder supply tool
8: Squeegee
9: Table
10: Controller

What is claimed is:

1. A method of shaping a hollow state support for supporting a workpiece from below, employing a three-dimensional shaping system, comprising the steps of:
   a lamination step including the steps of repeating alternation of a powder layer-forming step and a sintering step in which a powder layer is sintered by irradiation with one of a moving laser beam and electron beam, and
   forming with said lamination step an object of shaping at an upper region as a workpiece and an object of shaping at a lower region as the hollow state support comprising a lattice form with curved columnar bodies in a regular spaced order, and all crossings occurring at the curved columnar bodies, with a sintered strength at a connecting region of the hollow state support with the workpiece being lower than a sintered strength at other regions of the hollow state support, and providing that a degree of sintering of each layer of the hollow state support is lower than a degree of sintering of each layer in the workpiece.

2. The method of shaping a support according to claim 1, further comprising the step of designing a shape of the support at each height position by one of a CAM system and CAE system to adapt a shape and weight of the workpiece.

3. The method of shaping a support according to claim 2, further comprising the step of using the one of the CAM system and CAE system to select a material that is to compose the support.

4. The method of shaping a support according to claim 2, further comprising the steps of forming a single notch formed horizontally at or near a top end thereof for inserting fingers of an operator when the support is to be cut off from the workpiece, and designing the notch by one of the CAM system and CAE system, such that the notch is provided over a plurality of adjacent vertically oriented support members of the hollow state support.

5. The method of shaping a support according to claim 1, further comprising the step of providing the degree of sintering of at least one powder layer formed between a top end of the support and a bottom end of the workpiece to be lower than the degree of sintering at other lower side shaping regions of the support.

6. The method of shaping a support according to claim 1, further comprising the step of omitting sintering in some powder layers among the plurality of powder layers formed between a top end of the support and a bottom end of the workpiece.

7. A method of shaping a hollow state support for supporting a workpiece from below, employing a three-dimensional shaping system, comprising the steps of:

a lamination step including the steps of repeating alternation of a powder layer-forming step and a sintering step in which a powder layer is sintered by irradiation with one of a moving laser beam and electron beam, and forming with said lamination step an object of shaping at an upper region as a workpiece and an object of shaping at a lower region as the hollow state support comprising a lattice form with at least one of straight linear columnar bodies and curved columnar bodies crossing each other, with a sintered strength at a connecting region of the hollow state support with the workpiece being lower than a sintered strength at other regions of the hollow state support, designing a shape of the support at each height position by one of a CAM system and CAE system to adapt a shape and weight of the workpiece, and forming a single notch horizontally at or near a top end thereof for inserting fingers of an operator when the support is to be cut off from the workpiece, and designing the notch by one of the CAM system and CAE system, such that the notch is provided over a plurality of adjacent vertically oriented support members of the hollow state support, and providing that a degree of sintering of each layer of the hollow state support is lower than a degree of sintering of each layer in the workpiece.

8. The method of shaping a support according to claim 7, further comprising the step of using the one of the CAM system and CAE system to select a material that is to compose the support.

9. The method of shaping a support according to claim 7, further comprising the step of providing the degree of sintering of at least one powder layer formed between a top end of the support and a bottom end of the workpiece to be lower than the degree of sintering at other lower side shaping regions of the support.

10. The method of shaping a support according to claim 7, further comprising the step of omitting sintering in some powder layers among the plurality of powder layers formed between a top end of the support and a bottom end of the workpiece.

* * * * *